United States Patent [19]

Herbst

[11] 4,255,718
[45] Mar. 10, 1981

[54] TRANSVERSELY PUMPED DYE LASER HAVING IMPROVED CONVERSION EFFICIENCY

[75] Inventor: Richard L. Herbst, Menlo Park, Calif.

[73] Assignee: Quanta-Ray, Inc., Mountain View, Calif.

[21] Appl. No.: 908,380

[22] Filed: May 22, 1978

Related U.S. Application Data

[63] Continuation-in-part of Ser. No. 859,007, Dec. 9, 1977.

[51] Int. Cl.³ ............................................... H01S 3/20
[52] U.S. Cl. ............................ 331/94.5 L; 331/94.5 C
[58] Field of Search .................... 331/94.5 C, 94.5 L, 331/94.5 P

[56] References Cited
U.S. PATENT DOCUMENTS

| | | | |
|---|---|---|---|
| 4,016,504 | 4/1977 | Klauminzer | 331/94.5 C |
| 4,127,828 | 11/1978 | Klauminzer | 331/94.5 C |

*Primary Examiner*—William L. Sikes
*Attorney, Agent, or Firm*—Harry E. Aine; Harvey G. Lowhurst

[57] ABSTRACT

In a transversely pumped dye laser, such as a laser oscillator or laser amplifier, the optical pumping radiation is directed into the dye laser gain medium with the angle of divergence of the Poynting vector of the pumping wave radiation being not less than 45° and preferably 90° from the Poynting vector, or its reciprocal, of the optical wave radiation being amplified within the dye laser gain medium, whereby transverse pumping is obtained. In addition, the optical pumping wave radiation is directed into the dye laser gain medium with the angular divergence of the polarization of the electric vector of the pumping wave radiation being not greater than 45°, and preferably parallel to the polarization of the electric vector, or the reciprocal thereof, of the optical wave radiation which is being amplified by the dye laser gain medium, whereby the efficiency of conversion of pump energy into amplified optical wave energy is enhanced. In a preferred embodiment, the pump beam is directed generally parallel to and spaced from the output beam of the dye laser oscillator. A dye laser amplifier cell is disposed between the two beams and pump energy is directed through the amplifier cell generally in the opposite direction to that of the dye oscillator beam and approximately colinear therewith for longitudinal pumping in the amplifier.

9 Claims, 5 Drawing Figures

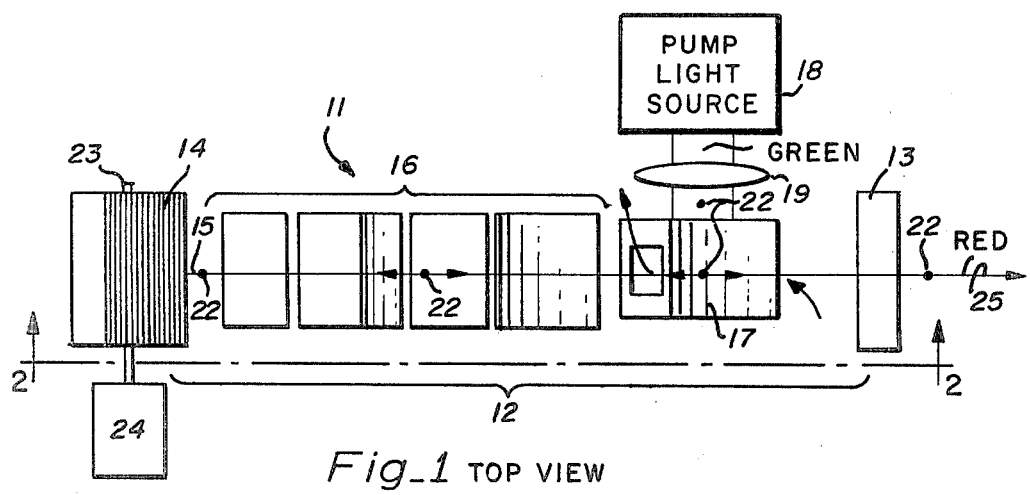
Fig_1 TOP VIEW
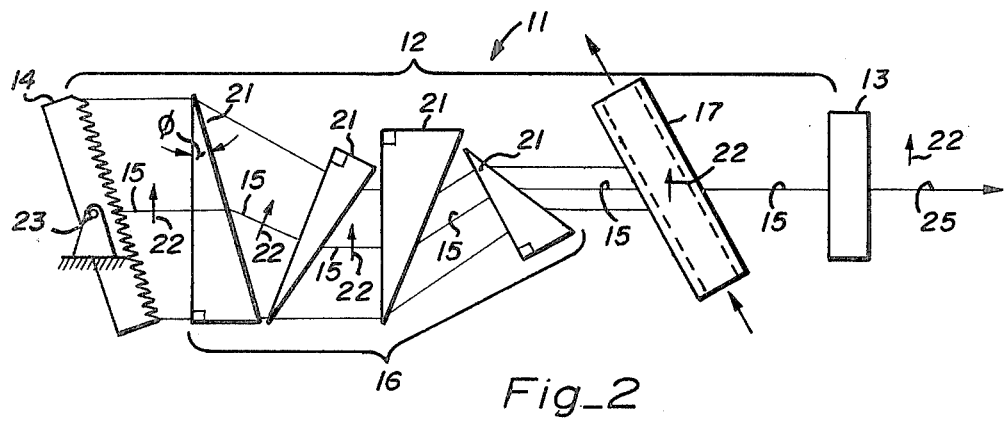
Fig_2
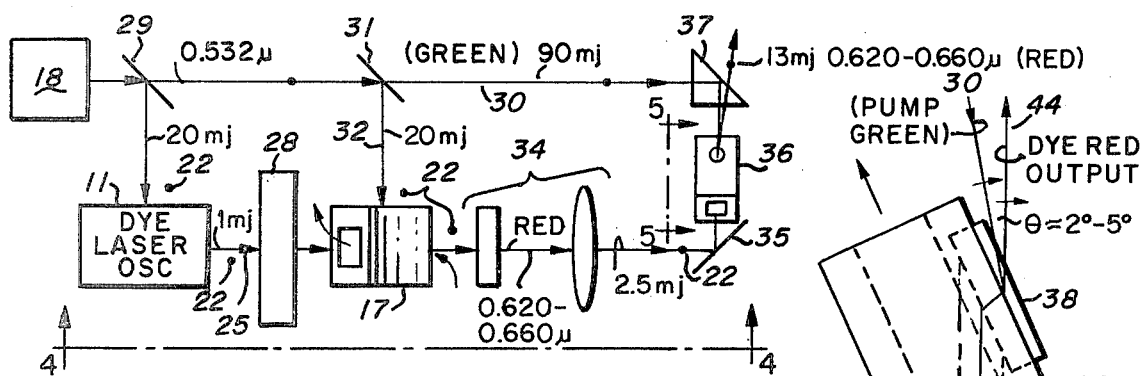
Fig_3 TOP VIEW
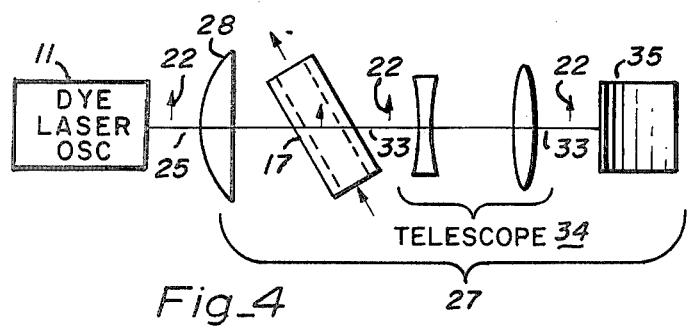
Fig_4
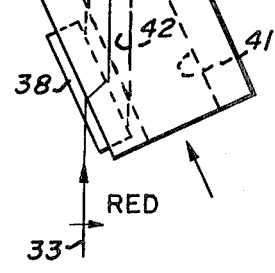
Fig_5

TRANSVERSELY PUMPED DYE LASER HAVING IMPROVED CONVERSION EFFICIENCY

RELATED CASES

The present invention is a continuation-in-part application of parent application U.S. Ser. No. 859,007, filed Dec. 9, 1977 and assigned to the same assignee as the present invention.

BACKGROUND OF THE INVENTION

Heretofore, transversely (side) pumped dye laser oscillators have been designed such that the polarization of the electric vector of the optical pumping radiation was generally orthogonal to the polarization of the electric vector of the optical wave radiation being amplified within the pumped dye laser gain medium. Such a dye laser is disclosed in U.S. Pat. No. 4,016,504 issued Apr. 5, 1977.

It is also known from the prior art in connection with optically pumped dye lasers of the type wherein the Poynting vector of the pumping light beam is approximately colinear with the Poynting vector of the optical wave radiation being amplified (longitudinally pumped) that the polarization of the electric vector of the pumping radiation and of the optical wave radiation being amplified within the dye laser gain medium are preferably parallel, for improved conversion efficiency. Such a dye laser is disclosed in an article appearing in volume 11, No. 1 of Optics Communications dated May 1974, pages 14–17.

SUMMARY OF THE PRESENT INVENTION

The principal object of the present invention is the provision of a transversely pumped dye laser oscillator or amplifier having improved conversion efficiency.

In one feature of the present invention, the dye laser gain medium is transversely pumped with optical wave radiation such that the angular divergence of the polarization of the electric vector of the pumping wave radiation is not greater than 45° from and preferably parallel to the electric vector, or the reciprocal thereof, of the optical wave radiation which is being amplified within the dye laser gain medium, whereby the conversion efficiency is enhanced.

In another feature of the present invention, the optical layout of a dye laser oscillator-amplifier apparatus includes a pumping beam path generally parallel to and spaced from the dye laser oscillator beam path, which is to be amplified, with a dye laser amplifier cell being disposed between the pump and oscillator beam paths with means for directing the pump and dye oscillator beams through the amplifier cell in opposite directions and approximately colinear to each other for longitudinal pumping of the oscillator beam in the amplifier cell, whereby an efficient compact laser oscillator-amplifier apparatus is provided.

Other features and advantages of the present invention will become apparent upon a perusal of the following specification taken with the accompanying drawings wherein:

BRIEF DESCRIPTION OF THE DRAWINGS

FIG. 1 is a top view of a dye laser oscillator incorporating features of the present invention, FIG. 2 is a side elevational view of the structure of FIG. 1 taken along line 2—2 in the direction of the arrows, FIG. 3 is a top or plan view of a dye laser oscillator followed by two dye laser amplifier stages and incorporating features of the present invention, FIG. 4 is a side elevational view of the structure of FIG. 3 taken along line 4—4 in the direction of the arrows, and FIG. 5 is an enlarged side elevational view of a portion of the structure of FIG. 3 taken along line 5—5 in the direction of the arrows.

DESCRIPTION OF THE PREFERRED EMBODIMENTS

Referring now to FIGS. 1 and 2, there is shown an optically pumped dye laser system 11 incorporating features of the present invention. The dye laser 11 includes an optical cavity resonator defined in the space between an output mirror 13 and a grating 14. Disposed along the optical axis 15 of the resonator 12 is a four prism beam expander 16 and a dye laser cell 17.

Pumping light derived from source 18 is directed into the dye cell 17 from the side or from a position transverse to the optical axis 15. A suitable pumping light source 18 is a Nd:YAG laser followed by a KD*P crystal frequency doubler for producing green light which is focused via a standard cylindrical lens 19 toward the plane containing the pump beam and the oscillator beam and into the dye laser gain medium within the dye cell 17. Such a Nd:YAG laser is commercially available from Quanta-Ray, Inc. of Mountain View, Calif. In a typical example, the dye within the dye cell 17 is selected from the group consisting of Coumarin 440, 460, 481, 500, 485, 540 A, Rhodamine 590, 610, 640, Kiton red, Cresyl violet 670, Oxazine 725 or Nile blue 690. Such dyes are commercially available from Exciton Chemical Co., Inc. of Dayton, Ohio. The typical dye content comprises 100 mg. of dye per liter in methanol.

As used herein, "transversely" is defined to include a minimum angular divergence of 45° of the Poynting vector of the pumping light with respect to the Poynting vector of the radiation being amplified and reflecting to and fro along the optical axis 15 within dye laser gain medium within the optical resonator 12 between the mirror 13 and the grating 14. In addition, the electric vector of the pumping light is polarized parallel to the polarization of the electric field vector of the optical radiation reflecting to and fro within the cavity 12 between the mirror 13 and the grating 14.

As used herein, "parallel" is defined to include a maximum angular divergence of 45°, and preferably no divergence, between the polarization of the electric field vector of the pumping wave of optical radiation and the polarization of the electric field vector or its reciprocal of the optical wave radiation reflecting to and fro within the resonator 12 between the mirror 13 and the grating 14 and which is to be amplified by the pumping light within the dye cell.

It is found that the conversion efficiency is approximately a cosine function of the angular divergence of the polarization of the pumping light electric field vector and the polarization of the electric field vector of the optical radiation being amplified within dye laser gain medium 12. Thus, optimum conversion efficiency is obtained when the angular divergence between the two electric field vectors is zero degrees, i.e., they are precisely parallel.

In a typical example, the dye cell 17 is made of BK-7 glass or fused silica. A suitable cell is commercially available from Precision Cell, Inc. of Hicksville, N.Y. In a typical example, the cell has a length of ¾ of an inch, is of square cross section with a hollow square passageway for the dye to flow therethrough. The cell wall thickness is typically 2 millimeters and the square cross section flow passageway is 6 millimeters across.

A suitable beam expander 16 has a beam magnification of 25 and comprises four prisms 21 made of a high optical quality material such as F-11 glass with surface flatness to $0.1\lambda$. In a typical example, each of the prisms 21 has an apex angle $\phi$ of approximately 35° and an index of refraction of 1.62. Such a beam expander is commercially available from Continental Optical Co. Hauppauge, N.Y. It is generally of a design disclosed by Hanna et al. in Optical and Quantum Electronics, Volume 7 (1975), pages 115-119 and also as published by G. K. Klauminzer in a paper delivered to attendees at the conference of Laser Engineering and Applications held in Washington, D.C. on 1-3 June of 1977. This type of prism beam expander serves to expand the height of the optical beam in the vertical direction as shown in FIG. 2 and also serves to polarize the optical wave radiation within the optical cavity resonator 12 in the vertical direction as indicated by the arrows 22.

In a typical example, the grating 14 comprises a Bausch and Lomb grating having 1800 grooves per millimeter and blazed at 5000 A°, or 600 grooves per millimeter blazed at 27,000 A°, such gratings are commercially available from the Bausch and Lomb of Rochester, N.Y. The grating serves to resolve the incident optical radiation into a selected wavelength which is reflected back through the optical resonator 12 to the output mirror 13. The resonant wavelength of the resonator is changed by turning the grating 14 about its axis of revolution 23. The precision servo mechanism 24 is provided for automatically changing the angular position of the grating 14 for tuning the resonator wavelength of the dye laser.

In operation, the dye material within the cell 17 is optically pumped by the pumping light derived from the light source 18 to produce a lasing population inversion of the energy states of the dye molecules for amplifying the resonator optical radiation passing to and fro within the optical resonator 12 at the resonant frequency thereof. A fraction of the energy within the resonator 12 is taken out through the partially reflective output mirror 13 as an output beam 25.

In a typical example, the pump light source 18 produces pulses of a pulse width of 7 nanoseconds of an energy of 25 millijoules which is approximately equal to 3.5 to 4.0 megawatts peak power at a pulse repetition rate of 10 hertz.

Utilizing Cresyl violet as the dye within the cell 17, the power output of the laser is in the red wavelength and is tunable from 0.620 to 0.660 microns with an energy output of 3 millijoules per pulse which is approximately equal to 600 kilowatts peak power for a pulse width of 5 nanoseconds at a pulse repetition rate of 10 hertz. In the case of the use of Rhodamine 590 dye, the energy output with the same pump power is approximately 9 millijoules which is approximately equal to 1.8 megawatts with a pulse width of 5 nanoseconds and a pulse repetition rate of 10 hertz.

Although the parallel polarization for side pumping has been described in regard to FIGS. 1 and 2 as it is employed in a laser oscillator 11, this is not a requirement of the invention and the parallel polarization may be employed to advantage in a laser amplifier as well as the laser oscillator. More particularly, referring now to FIGS. 3-5, there is shown a dye oscillator-laser amplifier system incorporating features of the present invention. In the system of FIGS. 3-5, the output of the dye laser oscillator 11 which may be the same as that shown in FIGS. 1 and 2, is fed into a dye laser amplifier portion of the system indicated at 27.

The dye laser amplifier 27 includes a cylindrical lens 28 which focuses the red output beam of the dye laser 11 into a second dye cell 17 substantially identical to the dye cell 17 previously described with regard to FIGS. 1 and 2. A portion of the output of the pump light source 18 is fed through a beam splitting mirror 29 to a second beam splitting mirror 31 for directing a portion of the pump light into the second dye cell 17 along beam path 32. As in the embodiment of FIGS. 1 and 2, the Poynting vector of the pumping light beam is directed transversely into the cell 17 relative to the Poynting vector of the dye laser oscillator beam 25 which is to be amplified in the second dye cell 17. Also, as previously described with regard to the oscillator embodiment of FIGS. 1 and 2 the electric vector of the pumping light beam 32 is vertically polarized as indicated at 22, so as to be substantially parallel to the electric field vector of the dye laser beam 25 within the amplifier cell 17.

As in the embodiment of FIGS. 1 and 2, the pump light is focused via cylindrical lens 19 into the plane of the pump and oscillator beams 25 and 30 and has a wavelength of 0.532 microns in the green and serves to amplify the red light beam with wavelengths tunable from 0.620 to 0.660 microns in the red. The input beam 25, to be amplified in amplifier cell 17, has a pulse width of five nanoseconds at a pulse repetition rate of 10 hertz with an energy of three millijoules which is pumped and amplified by the 25 millijoules of pump energy in beam 32 to an output of 10 millijoules to form the amplified output beam 33 of the laser amplifier cell 17.

The amplified output beam 33 is thence fed through a telescope 34 having a magnification ranging from 5 to 10 for increasing the diameter of the amplified beam 33 from approximately 1 millimeter to approximately 6 millimeters. The amplified and expanded output beam 33 is thence directed onto a 45° mirror 35 and thence into a second dye amplifier cell 36, more fully shown in expanded scale in the drawing of FIG. 5.

A 150 millijoule portion 30 of the pump beam is passed through the beam splitting mirror 31 and thence reflected by 90° by means of a prism 37 and directed generally longitudinally to the output beam 33 to be amplified into an amplifier cell 36 via a pair of Brewster angle windows 38 at opposite ends and on opposite sides of the amplifier cell 36 through which a dye laser gain medium is caused to flow for amplification of the input beam 33. Within the dye amplifier cell 36, longitudinal mode pumping is obtained in the manner as previously disclosed by the aforecited Optics Communications article of May 1974. Dye cell 35 includes a longitudinal passageway 41 through which the dye is caused to flow and a bore 42 interconnects the two windows 38 to provide passage of the pump and input optical waves therethrough in a generally colinear manner. The mirror 35 and prism 37 are tilted relative to each other such that the input beam 33 is canted at an angle $\theta$ of approximately 2° to 5° to one side of the pump beam so that the output amplified beam 44 can be taken to the side of the prism 37 to a utilization device, not shown.

With an input optical wave 33 of an energy of approximately 10 millijoules and with an optical pump wave 30 having an energy of approximately 150 millijoules, the output wave 44 is produced having an energy of 45 millijoules and tunable in the red from 0.620 and 0.660 microns. The 45 millijoule pulses of width of 5 nanoseconds correspond to a peak output power of approximately 9 megawatts.

The advantage of arranging the polarization of the electric vector of the pumping wave to be essentially parallel to the polarization of the electric field vector of the optical wave energy to be amplified in the dye gain medium is that the conversion efficiency is substantially improved in a transversely pumped dye laser oscillator or amplifier. Typical measured improvement in the conversion efficiency is the improvement from a conversion efficiency of 8% to an efficiency of 15%, at a pump power of 1 megawatt.

An additional advantage of arranging the longitudinally pumped dye laser amplifier cell 36 in a position between the generally parallel pump beam 30 and dye laser oscillator beam 33 is that a relatively compact design is achieved while also providing good temporal overlap of the pump and dye oscillator pulses, as desired for high efficiency. In a preferred embodiment, the dye amplifier cell, in addition to being disposed between the pump and oscillator beams is preferably more closely spaced to the oscillator beam 33 than to the pump beam 30. For example, in a preferred embodiment the center of the amplifier cell 36 is 8 1/2 inches from the pump beam 30 and between three and four inches from the oscillator beam 33. Also, in some designs where the particular dye utilized has a relatively high gain, such as R590, it is desirable to eliminate the first preamplifier cell 17 because if there is excessive gain an undesired fluorescence background is found in the output beam 44.

What is claimed is:

1. In a method for transversely pumping a dye laser gain medium the steps of:
   providing a beam of electrically polarized optical wave radiation to be amplified in a dye laser gain medium; and
   directing electrically polarized pumping optical wave radiation into the dye laser gain medium with the angular divergence of the Poynting vector of the pumping wave radiation being not less than 45° from the Poynting vector or the reciprocal thereof of the optical wave radiation being amplified in the dye laser gain medium, and with the angular divergence of the electric polarization vector of the pumping wave radiation being not greater than 45° from the electric polarization vector or the reciprocal thereof of the optical wave radiation which is being amplified in the dye laser gain medium, whereby the efficiency of conversion of pump energy into amplified optical wave radiation energy is enhanced for such a transversely pumped dye laser gain medium.

2. In the method of claim 1 wherein the polarization of the electric vector of the optical pumping wave radiation is approximately parallel to the polarization of the electric vector or the reciprocal thereof of the dye laser optical wave radiation being amplified.

3. In a dye laser amplifying apparatus:
   dye cell means for containing a dye laser gain medium;
   input beam directing means for directing a beam of input optical wave radiation to be amplified through said dye cell means;
   pump beam directing means for directing a beam of pumping optical wave radiation into said dye cell means at an angle of divergence of the Poynting vector of the pumping wave from the Poynting vector or the reciprocal thereof of the input optical wave of not less than 45° for converting pump wave energy into the beam of optical wave radiation being amplified to produce amplification of the input beam; and
   polarizing means for polarizing the electrical vectors of the pumping optical wave radiation and the input optical wave radiation as present within said dye cell with an angular divergence therebetween of less than 45°.

4. The apparatus of claim 3 wherein said polarizing means is formed and arranged for polarizing the electric vector of the optical pumping wave radiation to be approximately parallel to the polarization of the electric field vector or the reciprocal thereof of the dye laser optical wave radiation to be amplified within said dye cell means.

5. In a dye laser apparatus of the type including a pair of spaced apart optical reflectors defining an optical cavity having a dye cell and a beam expander disposed within said cavity and a light pumping source for optically exciting the dye laser gain medium to a lasing condition, the improvement comprising:
   dye cell means for containing a dye laser gain medium;
   input beam directing means for directing a beam of input optical wave radiation to be amplified through said dye cell means;
   pump beam directing means for directing a beam of pumping optical wave radiation into said dye cell means at an angle of divergence of the Poynting vector of the pumping wave from the Poynting vector or the reciprocal thereof of the input optical wave of greater than 45° for converting pumping wave energy into the beam of optical wave radiation being amplified to produce amplificaton of the input beam; and
   polarizing means for polarizing the electric vectors of the pumping optical wave radiation and the input optical wave radiation in said dye cell means with an angular divergence therebetween of less than 45°.

6. The apparatus of claim 5 wherein said polarizing means is formed and arranged for polarizing the electric vector of the optical pumping wave radiation to be approximately parallel to the polarizing of the electric vector or the reciprocal thereof of the dye laser optical wave radiation being amplified.

7. In a dye laser apparatus;
   dye laser oscillator means for generating an output oscillator beam of coherent optical radiation to be amplified and directed along a first path;
   pump means for generating a pumping beam of coherent optical radiation and for directing said pumping beam along a second beam path in general parallelism with and spaced from said oscillator beam path;
   dye amplifier means for amplifying said dye oscillator beam and being disposed between said generally parallel first and second beam paths; and beam diverter means for diverting at least portions of said first and second dye oscillator and pump beams into said dye amplifier means for generally opposite directions and in general parallelism for longitudinal pumping of said diverted dye oscillator beam energy within said dye amplifier means.

8. The apparatus of claim 7 including second beam diverter means disposed along said pump beam path for diverting at least a portion of said pump beam into said dye oscillator means along a beam path directed generally orthogonal to the direction of said dye oscillator beam path for transversely pumping said dye oscillator means.

9. The apparatus of claim 8 including second dye amplifier means disposed along said dye oscillator beam path for amplifying the energy of said dye oscillator beam; and third beam diverter means disposed along said pump beam path for diverting at least a portion of said pump beam into said second dye amplifier means along a beam path directed generally orthogonal to the direction of said dye oscillator beam path for transversely pumping said second dye amplifier means.

* * * * *